United States Patent Office 3,551,209
Patented Dec. 29, 1970

3,551,209
FORMATION OF SKELETAL METAL SOLID ELECTROLYTE FUEL CELL ELECTRODES
James J. Alles and Herbert E. Ricks, Pittsburgh, Wallace D. Reed, Monroeville, and Jay B. Carter, Greensburg, Pa., assignors, by mesne assignments, to the United States of America as represented by the Secretary of the Interior
No Drawing. Filed May 21, 1969, Ser. No. 826,724
Int. Cl. C23b 5/52; C23f 17/00; H01m 27/04
U.S. Cl. 136—120                       10 Claims

ABSTRACT OF THE DISCLOSURE

A porous nickel, iron or cobalt electrode is coated on a solid ceramic electrolyte by (a) electrolessly depositing the metal on the electrolyte; (b) electrodepositing a second layer of the metal, while alloyed with molybdenum or tungsten, onto the electrolessly deposited layer; and (c) heating the electrodeposited layer in the presence of water vapor to drive off the molybdenum or tungsten as a volatile oxide.

---

This invention relates to solid electrolyte fuel cells having porous gas-diffusible metal electrodes such as skeletal nickel.

In the construction of solid electrolyte fuel cells, a common type of electrode employed is a gas-diffusion electrode, e.g., porous or skeletal nickel. This electrode is employed when the fuel or oxidant fed thereto is in the form of a gas. During fabrication it is necessary that the electrode material be applied in such a manner that it will intimately adhere to the solid ceramic electrolyte even after many hours of operation of the cell under high current densities.

Heretofore, nickel-coated solid electrolyte fuel cells have been fabricated by vacuum deposition of the nickel onto the electrolyte. The disadvantages of such a fuel cell are the high cost of manufacturing and high polarization losses due to lack of porosity in the nickel electrode.

We have now developed an improved porous nickel electrode solid electrolyte fuel cell. Basically, our invention comprises forming, by electroless plating, a thin, uniform nickel coating on the surface of the solid electrolyte; electroplating a nickel-tungsten or nickel-molybdenum alloy onto the coating described in the first step; and heat treating the resultant twice-coated electrolyte in the presence of water vapor to remove the second constituent (Mo or W) of the electroplated layer by the formation of its volatile oxide. The result is a porous nickel electrode capable of long life.

As a modification, the electrolessly deposited layer or coating can include another element such as phosphorus whereby the subsequent heat treatment step diffuses the phosphorus or other element into the electroplated layer. Further, the process is also applicable with regard to fabricating porous cobalt or iron electrodes.

It is therefore an object of the present invention to produce a porous nickel, cobalt or iron electrode solid electrolyte fuel cell. A further object is to produce such a fuel cell which possesses long life. Further objects and advantages will be obvious from the following more detailed description of the invention.

In the practice of the invention, the surface of a solid ceramic electrolyte usually composed of calcia- or yttria- stabilized zirconia in the shape of a disc, tube, rectangular plate, etc., is degreased by washing with, for example, an organic solvent and/or aqua regia. After degreasing, the electrolyte is submerged in an electroless nickel plating solution. Such solutions are well known in the art and are generally composed of metal hypophosphites. Typical electroless coating operations suitable for the purposes of the present invention are disclosed in U.S. Pats. Nos. 2,995,944, 2,816,846 and 3,411,953. In this manner a thin layer of nickel is plated onto the electrolyte. Preferably, the layer should be about $5 \times 10^{-3}$ mm. to about $10^{-2}$ mm. in thickness.

Once the nickel film is formed on the solid ceramic electrolyte, a nickel-tungsten or nickel-molybdenum alloy, preferably containing about 92 to about 98 weight percent nickel, is electrodeposited onto the nickel base coat. Electrodeposition is carried out in a prior art manner well known to those skilled in the art. Typical electrodeposition coating operation suitable for the purposes of the present invention are disclosed in U.S. Pats. Nos. 2,802,779, 2,599,178 and 2,432,893. The thickness of the electrodeposited nickel alloy coating is preferably about $5 \times 10^{-3}$ mm. to about $10^{-2}$ mm.

After the alloy has been applied, the coated solid electrolyte is placed in an environment which contains no free oxygen, and the coating is contacted with water vapor while being heated to a temperature of about 900° C. to about 1100° C. to form a volatile oxide of the secondary constituent (Mo or W). Preferably, though not necessarily, the coating is heated to a temperature above the temperature at which the fuel cell will be operated in order that the remaining skeletal nickel structure be stable at cell operating temperatures.

Heat treatment of the electroplated layer is carried on for a period of time sufficient to remove a substantial amount of the secondary constituent, preferably to the extent that the layer subsequently contains no more than about .1–.4 weight percent Mo or W. Heating can be sustained in an atmosphere which is exclusively water vapor or which also contains an inert gas such as argon. It is necessary that no free oxygen be present in the atmosphere so that nickel oxides should not form.

As alternatives in the practice of the present invention, cobalt or iron, instead of nickel, can be applied to the solid electrolyte. With these metals, the specific operating conditions are essentially the same as those described above for nickel. As a further alternative the electrolessly deposited coating may include phosphorus preferably in an amount of about 1 to about 10 weight percent, in which case the subsequent heat treatment after electrodeposition will diffuse the phosphorus into the electroplated layer so that the entire electrode will be a stable solid with a melting point well above the temperature at which the resultant fuel cell will be operated.

The following example illustrates the process of the present invention:

EXAMPLE

Twelve degreased ½″ diameter, 1.5 gm. discs were placed in 100 ml. of an aqueous solution (pH 8–9) at a temperature of 95° C. and composed of $NiCl_2 \cdot 6H_2O$ (30 g./l.), NHCl (50 g./l.), sodium citrate (10 g./l.) and sodium hypophosphite (10 g./l). After 2 hours, when the discs had a $10^{-2}$ mm. coating of nickel phosphorous alloy, they were removed from the bath and dried in air.

Thereafter the discs were placed in an electroplating solution having the following composition:

$NiCl_2 \cdot 6H_2O$ (21 g./l.); $NiSO_4 \cdot 6H_2O$ (250 g./l.)

$Na_2WO_3 \cdot 2H_2O$ (3.6 g./l.); 70° C.; pH 4

The electrolessly-deposited nickel coating functioned as the cathode, and a Pt electrode functioned as the anode under a current density of 10 amps./sq. ft. After 5 hours, when $10^{-2}$ mm. of nickel-tungsten (2% tungsten) had been deposited on the first nickel layer, the operation was terminated.

The nickel coated electrolyte discs were then placed in a Hoskins furnace, and the furnace purged with argon gas. Thereafter water vapor was injected into the furnace, and sufficient heat was imparted to the furnace to heat the nickel layer to 900° C. The rate of vapor addition was one liter per hour. After 4 hours, when the percentage of tungsten in the electrodeposited layer had been reduced to .1 weight percent, the heat treatment was suspended.

In the practice of the present invention, each of the steps can be readily carried out, and are comparatively low in cost. Furthermore these techniques are easily adaptable to automatic production.

What is claimed is:

1. A process for making an electrode for a solid electrolye fuel cell comprising:
   (a) electrolessly plating a metal onto the surface of a solid ceramic electrolyte, said metal selected from the group consisting of nickel, cobalt and iron;
   (b) electrodepositing an alloy onto said electrolessly plated coating, said alloy selected from the group consisting of an alloy of said metal and tungsten, and an alloy of said metal and molybdenum; and
   (c) heating said electrocoated electrolyte in the presence of a gas essentially free of free oxygen, said gas selected from the group consisting of water vapor and an inert gas-water vapor mixture, said heating being conducted for a period of time to drive off said tungsten or molybdenum from said electrodeposited alloy coating.

2. The process of claim 1 wherein said electrolessly deposited coating contains phosphorus, and wherein said heating step diffuses said phosphorus into said electrodeposited coating.

3. The process of claim 1 wherein said electrolessly deposited coating is about $5 \times 10^{-3}$ mm. to about $10^{-2}$ mm. in thickness, and wherein said electrodeposited coating is about $5 \times 10^{-3}$ mm. to about $10^{-2}$ mm. in thickness.

4. The process of claim 1 wherein said electrodeposited coating contains 2–6 weight percent of said tungsten or molybdenum along with said metal prior to step (c), and wherein said metal is nickel.

5. The process of claim 4 wherein said tungsten or molybdenum is reduced to .1 weight percent of said electrodeposited coating during said heating step.

6. The process of claim 2 wherein said electrodeposited coating contains 2–6 weight percent of said tungsten or molybdenum along with said metal prior to step (c), and wherein said metal is nickel.

7. The process of claim 6 wherein said tungsten or molybdenum is reduced to .1 weight percent of said electrodeposited coating during said heating step.

8. The process of claim 3 wherein said electrodeposited coating contains 2–6 weight percent of said tungsten or molybdenum along with said metal prior to step (c), and wherein said metal is nickel.

9. The process of claim 8 wherein said tungsten or molybdenum is reduced to .1 weight percent of said electrodeposited coating during said heating step.

10. The coated electrolyte produced by the process of claim 1.

References Cited

UNITED STATES PATENTS

| | | | |
|---|---|---|---|
| 3,250,646 | 5/1966 | Hipp | 136—86 |
| 3,300,344 | 1/1967 | Bray et al. | 136—86 |
| 3,415,734 | 12/1968 | Kalhammer | 136—86 |

FOREIGN PATENTS

| | | | |
|---|---|---|---|
| 266,232 | 6/1964 | Australia | 136—120 |

ALLEN B. CURTIS, Primary Examiner

M. J. ANDREWS, Assistant Examiner

U.S. Cl. X.R.

204—37, 38